United States Patent
Chirayil et al.

(10) Patent No.: US 10,157,359 B2
(45) Date of Patent: Dec. 18, 2018

(54) SERVICE DEVICE FEEDBACK

(71) Applicant: International Business Machines Corporation, Armonk, NY (US)

(72) Inventors: Joshi M. Chirayil, Phoenix, AZ (US); Rajendra S. Kanyal, Phoenix, AZ (US); Dhaval K. Shah, Nadiad (IN); Anupam Varma, Petaluma, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/434,030

(22) Filed: Feb. 15, 2017

(65) Prior Publication Data

US 2018/0232678 A1    Aug. 16, 2018

(51) Int. Cl.
| | |
|---|---|
| *G10L 21/00* | (2013.01) |
| *G06Q 10/06* | (2012.01) |
| *G10L 15/18* | (2013.01) |
| *G10L 15/22* | (2006.01) |
| *G06K 9/00* | (2006.01) |
| *G06F 17/27* | (2006.01) |
| *G06F 17/30* | (2006.01) |

(52) U.S. Cl.
CPC ... *G06Q 10/06395* (2013.01); *G06F 17/2775* (2013.01); *G06K 9/00335* (2013.01); *G10L 15/1815* (2013.01); *G10L 15/1822* (2013.01); *G10L 15/22* (2013.01); *G06F 17/30864* (2013.01)

(58) Field of Classification Search
CPC ....... G10L 15/30; G10L 15/19; G10L 15/142; G10L 15/18; G10L 15/1815; G10L 15/183; G10L 15/22; G10L 15/285; G06F 17/2775; G06F 17/30864; G06F 17/27; G06F 17/2715; G06F 17/1785; G06F 17/2809; G06F 17/2818; G06F 17/30401; G06F 17/3043; G06F 17/30684; G06F 21/32; G06F 21/6209; G06F 21/78; G06F 21/79; G06F 2221/2107
USPC ..................... 704/270, 270.1, 275
See application file for complete search history.

(56) References Cited

U.S. PATENT DOCUMENTS

| | | | |
|---|---|---|---|
| 6,968,076 B1 | 11/2005 | Ouyang et al. | |
| 7,058,325 B2 | 6/2006 | Hamby et al. | |
| 7,698,131 B2* | 4/2010 | Bennett | G06F 17/2775 704/215 |
| 7,725,320 B2* | 5/2010 | Bennett | G06F 17/2775 704/255 |

(Continued)

*Primary Examiner* — Vijay B Chawan
(74) *Attorney, Agent, or Firm* — Yee & Associates, P.C.; Jay Wahlquist (57) ABSTRACT

A method for using oral feedback to facilitate user selection among a plurality of service devices. The method comprises a plurality of service devices. Each service device has a dynamically-updatable quality control profile. A first service device receives a request from the first user to perform a first service job. The first service device performs the first service job. A first recording device located proximate to the first service device obtains oral feedback from the first user regarding the quality of the first service job. The first service device analyzes the oral feedback using natural language processing to form an analysis. The first service device modifies the first quality control profile of the first service device based on the analysis.

20 Claims, 5 Drawing Sheets

(56) References Cited

U.S. PATENT DOCUMENTS

| | | | |
|---|---|---|---|
| 7,729,904 B2* | 6/2010 | Bennett | G06F 17/27 |
| | | | 704/215 |
| 8,854,669 B1 | 10/2014 | Jazayeri et al. | |
| 8,943,325 B2* | 1/2015 | Boutant | G06F 21/6209 |
| | | | 713/180 |
| 9,118,763 B1* | 8/2015 | Margulies | H04M 3/5191 |
| 2006/0200353 A1* | 9/2006 | Bennett | G06F 17/2775 |
| | | | 704/270.1 |
| 2007/0179789 A1* | 8/2007 | Bennett | G06F 17/2775 |
| | | | 704/270.1 |
| 2009/0141302 A1* | 6/2009 | Balm | H04N 1/00222 |
| | | | 358/1.15 |
| 2009/0193519 A1* | 7/2009 | Tamkhane | G06F 21/78 |
| | | | 726/19 |
| 2012/0105200 A1* | 5/2012 | Yoo | G06F 21/32 |
| | | | 340/5.82 |
| 2013/0194607 A1 | 8/2013 | Jones | |
| 2015/0149315 A1* | 5/2015 | Tischer | G06Q 30/0601 |
| | | | 705/26.1 |
| 2015/0331402 A1 | 11/2015 | Lin et al. | |
| 2015/0347367 A1* | 12/2015 | Berke | G06F 17/241 |
| | | | 715/771 |
| 2016/0260432 A1 | 9/2016 | Buser et al. | |

\* cited by examiner

SERVICE DEVICE FEEDBACK

BACKGROUND

1. Field

The present disclosure relates generally to an improved computer system and more specifically to a method, apparatus, and computer program product for performing a service job on a service device. Still, more particularly, the present disclosure relates to a method, apparatus, and computer program product for using oral feedback to facilitate user selection among a plurality of service devices.

2. Description of the Related Art

The need to perform basic administrative duties as quickly as possible drives the need for tools that improve office productivity. In many offices, one major bottleneck that workers face is the printer. When printer resources are limited, the ability to maximize printer productivity is critical to improving efficiency. This problem is compounded by printer malfunction and print jobs that are not printed with a requisite quality, due to, for example low toner. The worker must then resubmit the print job to another printer. Additionally, to address the malfunction, a work order must be submitted for the printer. This requires the worker to initiate the work order process, often at a location work computer terminal that is remote from the printer. Therefore, the worker often forgets, or simply neglects to initiate the work order process. This in turn can lead to additional use of the malfunctioning printer by other workers, and the additional loss of productivity.

Automatic product dispensing machines (i.e. vending machines) are a useful mechanism by which to serve customers through instantaneous dispensation of chosen products. However, the exhaustion of a machine's supply of a specific item can be a source of irritation and aggravation to the user who has traveled to the machine in search of that specific product or has to settle for another product. Furthermore, the malfunction of a vending machine when items are not being dispensed is not only be a source of irritation and aggravation, but a financial inconvenience, requiring the user to contact and owner of the vending machine and submit a refund request.

SUMMARY

An embodiment of the present disclosure provides a method for using oral feedback to facilitate user selection among a plurality of service devices, each service device having a dynamically-updatable quality control profile. The method comprises a first service device. The first service device receives a request from the first user to perform a first service job. The first service device performs the first service job. A first recording device located proximate to the first service device obtains oral feedback from the first user regarding the quality of the first service chop. The first service device analyzes the oral feedback using natural language processing to form an analysis. The first service device modifies the first quality control profile of the first service device based on the analysis.

Another embodiment of the present disclosure provides a service device. The computer system comprises a processor unit, a recording device, a natural language processing agent, and a quality control profile. The recording device and the natural language processing agent run on the processor unit. The recording device is configured to receive oral feedback from a first user regarding a quality of the first service job performed by the first service device. The natural language and processing agent is configured to analyze the oral feedback to form an analysis. The processor unit dynamically updates the quality control profile based on the analysis of the oral feedback.

Yet another embodiment of the present disclosure provides a computer program product. The computer program product comprises a computer-readable storage medium, a first program code, a second program code, a third program code, a fourth program code, and a fifth program code. The first program code is stored on the computer-readable storage medium, and receives a request from a first user to perform a first service job by a first service device. The second program code is stored on the computer-readable storage medium, and performs the first service job. The third program code is stored on the computer-readable storage medium, and obtains oral feedback from the first user regarding a quality of the first service job using a first recording device located proximate to the first service device. The fourth program code is stored on the computer-readable storage medium, and analyzes the oral feedback using natural language processing to form an analysis. The fifth program code is stored on the computer-readable storage media, and modifies the first quality control profile of the first service device based on the analysis.

The features and functions can be achieved independently in the various embodiments of the present disclosure or may be combined in yet other embodiments, in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction processing device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of computer-readable storage medium includes the following: a portable computer diskette, a hard disk, a random access memory (RAM), a read-only memory (ROM), an erasable programmable read-only memory (EPROM or Flash memory drive), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing or processing devices from a computer-readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing or processing device receives computer-readable program instructions from the network and forwards the computer-readable program instructions for storage in a computer-readable storage medium within the respective computing or processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, or combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other devices implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, a segment, or a portion of instructions, which comprise one or more instructions for implementing the specified logical function or functions. In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, or combinations of blocks in the block diagrams and/or flowchart illustrations, can be implemented by special purpose hardware-based systems that perform the specified functions or acts or carry out combinations of special purpose hardware and computer instructions.

The illustrative examples provide a method, apparatus, and computer program product for using oral feedback to facilitate user selection among a plurality of service devices, each service device having a dynamically-updatable quality control profile. In one illustrative example, a computer system implements a method. A request from a first user to perform a first service job is received by a first service device. The first service device performs the first service job.

A first recording device located proximate to the first service device obtains oral feedback from the first user regarding a quality of the first service job. The oral feedback is analyzed using natural language processing to form an analysis. A first quality control profile of the first service device is modified based on the analysis.

Figure 1:
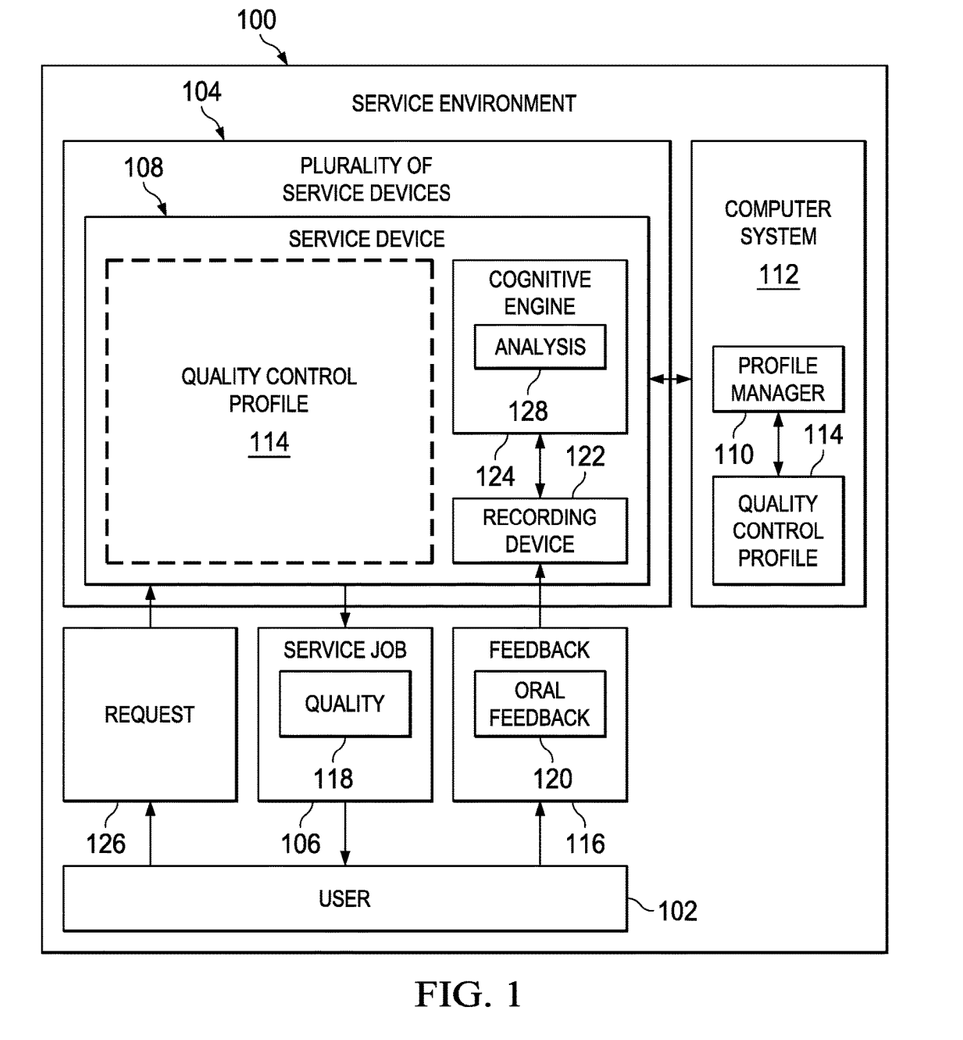
FIG. 1 is an illustration of a service environment in accordance with an illustrative embodiment.

With reference now to the figures and, in particular, with reference to FIG. 1, an illustration of a service environment is depicted in accordance with an illustrative embodiment. As depicted, service environment 100 is an environment in which user 102 may request one of plurality of service devices 104 to perform service job 106.

Plurality of service devices 104 includes at least one service device, such as service device 108. Service device 108 may take various forms in this example. For example, service device 108 may be selected from at least one of a printer, a scanner, an automatic teller machine, a vending machine, or some other type of service device.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In this illustrative example, profile manager 110 in computer system 112 operates to manage plurality of service devices 104. Computer system 112 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

In the illustrative example, profile manager 110 manages service device 108 according to quality control profile 114 for service device 108. Quality control profile 114 may be stored in a number of different locations. For example, quality control profile 114 may be stored in at least one of plurality of service devices 104, computer system 112, a cloud storage, a network attached storage system, or some other suitable type of storage system or service.

As depicted, profile manager 110 dynamically updates quality control profile 114 based on feedback 116 received from user 102 regarding quality 118 of service job 106 performed by service device 108. For example, feedback 116 may be oral feedback 120. As depicted, oral feedback 120 is natural language spoken by user 102 regarding quality 118.

For example, when service device 108 is a printer, service job 106 is a print job performed by service device 108. Oral feedback 120 therefore may include spontaneous statements by user 102 regarding the print quality or operation of service device 108. For example, user 102 may orally state, "it's dark," "it's not good quality," "the paper is blank," "it's low on toner," or other natural language regarding quality 118 of service job 106. For example, user 102 may orally state, "the printer has malfunctioned," "the paper is jammed," or "it doesn't print anything, just blank papers or blank lines."

For example, when service device 108 is a vending machine, service job 106 may be vending of a food item by service device 108. Oral feedback 120 therefore may include spontaneous statements by user 102 regarding the quality of the dispensed food item or operation of service device 108. For example, user 102 may orally state, "it's not working," "it's not good quality," "not working properly," "does not dispense anything," "this has expired," "this tastes disgusting," or other natural language regarding quality 118 of service job 106.

In another illustrative example, service device 108 may be connectable through a peer to peer (P2P) connection to other service devices 104. In this illustrative example, service device 108 separately manages quality control profile 114 for service device 108. Likewise, each of other service devices 104 separately manages a corresponding quality control profile for service device.

Service device 108 receives request 126 from user 102 to perform service job 106. Service device 108 performs service job 106. Oral feedback 120 from user 102 can then be obtained regarding quality 118 of service job 106 by recording device 122.

Recording device 122 is one of a group of components in service device 108. As used herein, a "group of" when used with reference items means one or more items. For example, a group of components in service device 108 means one or more components in service device 108. As depicted, service device 108 includes recording device 122 and cognitive engine 124.

As depicted, recording device 122 is a device for recording oral feedback 120. Recording device 122 may take a number of different forms. For example, recording device 122 may be selected from one of a digital audio recorder, an analog audio recorder, or some other suitable type of device that records oral feedback 120.

As depicted, service device 108 includes cognitive engine 124. Cognitive engine 124 is a component of service device 108 for analyzing and understanding oral feedback 120. For example, cognitive engine 124 can be a mechanism to parse the natural language of, and derive meanings of the words spoken in oral feedback 120. In an illustrative example, cognitive engine 124 parses the natural language of, and derives meanings of the words spoken in oral feedback 120 in more than one natural language. Cognitive engine 124 is then able to derive a context of oral feedback 120, such as whether oral feedback 120 is positive feedback or negative feedback regarding quality 118 of service job 106, parse the natural language of, and derive meanings of the words spoken in oral feedback 120.

Cognitive engine 124 may be implemented in software, hardware, firmware or a combination thereof. When software is used, the operations performed by cognitive engine 124 may be implemented in program code configured to run on hardware, such as a processor unit. When firmware is used, the operations performed by cognitive engine 124 may be implemented in program code and data, and stored in a persistent memory to run on a processor unit. When hardware is employed, the hardware may include circuits that operate to perform the operations in cognitive engine 124.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Programmable logic devices include, for example, a programmable logic array, a programmable array logic, a field programmable logic array, a field programmable gate array, and other suitable types of hardware devices. Additionally, the processes may be implemented in organic components integrated with inorganic components and may be comprised entirely of organic components, excluding a human being. For example, the processes may be implemented as circuits in organic semiconductors.

Cognitive engine 124 uses natural language processing to analyze oral feedback 120 to form analysis 128. As depicted, analysis 128 is a result generated by cognitive engine 124 from a statistical or rule-based modeling of oral feedback 120. Based on analysis 128, profile manager 110 updates quality control profile 114 of service device 108.

In one illustrative example, one or more technical solutions are present that overcome a technical problem with managing a plurality of service devices 104 based on feedback 116 from user 102. As a result, one or more technical solutions may provide a technical effect of reducing the time and effort needed by user 102 to generate service job 106 of a particular quality 118 when using plurality of service devices 104. One or more technical solutions may be included as part of plurality of service devices 104 when offered as a service through computer system 112 communicating with plurality of service devices 104 for receiving request 126 to perform service job 106.

As a result, computer system 112 operates as a special purpose computer system in which profile manager 110 in computer system 112 enables quality control profile 114, and in particular, modifying quality control profile 114 based on analysis 128 of oral feedback 120 regarding quality 118 of service job 106. In particular, profile manager 110 transforms computer system 112 into a special purpose computer system as compared to currently available general computer systems that do not have profile manager 110.

Figure 2:
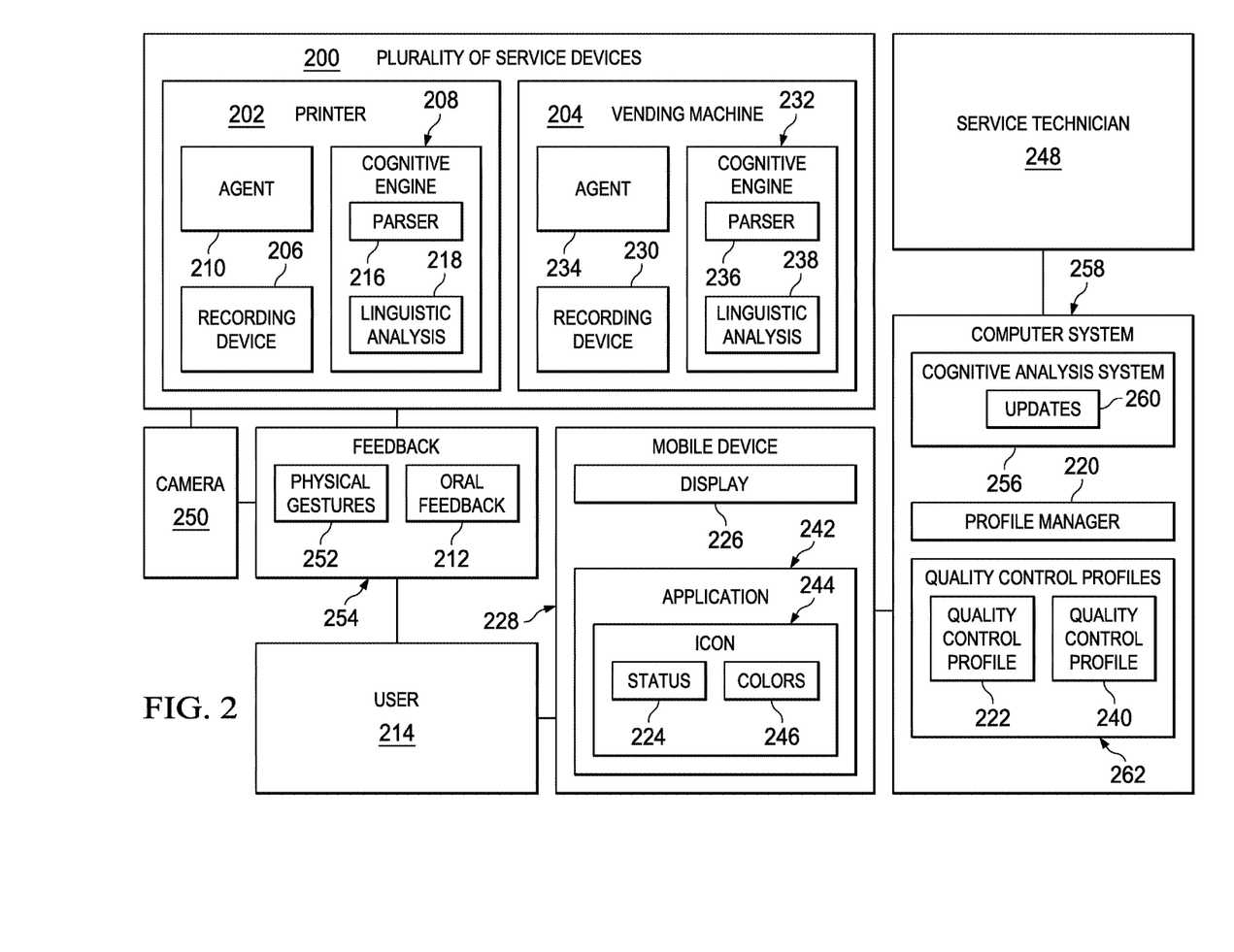
FIG. 2 is an illustration of an implementation for a plurality of service devices in accordance with illustrative embodiment.

With reference next to FIG. 2, an illustration of an implementation for a plurality of service devices is depicted in accordance with illustrative embodiment. In this example, plurality of service devices 200 is an example of one implementation for plurality of service devices 104 in FIG. 1.

Plurality of service devices 200 includes a number of different service devices. As depicted, plurality of service devices 200 includes printer 202 and vending machine 204.

Printer 202 is an example of one type of service device that may be implemented within plurality of service devices 200, such as service device 108 of FIG. 1. Printer 202 includes a number of different components. As depicted, printer 202 includes recording device 206, cognitive engine 208, and agent 210.

Recording device 206 is an example of recording device 122 of FIG. 1. Recording device 206 is associated with printer 202. When one component is "associated" with another component, the association is at least one of a physical integration or an operable association. For example, a first component, recording device 206, may be considered to be associated with a second component, printer 202, by at least one of being secured to the second component, bonded to the second component, mounted to the second component, operably integrated into the second component, implemented as a sub-component of the second component, or otherwise operably associated with the second component in some other suitable manner. In one illustrative example, recording device 206 is considered to be associated with the second component by being operably integrated as a component of printer 202.

Recording device 206 stores oral feedback 212 provided by user 214 in response to a print job performed by service device 108. Oral feedback 212 may include spontaneous statements by user 214 regarding the print quality or operation of printer 202. For example, user 214 may orally state, "it's dark," "it's not good quality," "the paper is blank," "it's low on toner," "the printer has malfunctioned," "the paper is jammed," or "it doesn't print anything, just blank papers or blank lines."

Cognitive engine 208 is an example of cognitive engine 124 of FIG. 1. In this illustrative example, cognitive engine 208 uses natural language processing to analyze oral feedback 212. As depicted, cognitive engine 208 includes parser 216 and linguistic analysis 218. Parser 216 parses natural language words from oral feedback 212 stored on recording device 206. Linguistic analysis 218 infers a contextual meaning of the natural language words regarding the quality of the print job by printer 202.

In one illustrative example, linguistic analysis 218 analyzes morphological, syntactical, and semantic structures of oral feedback 212 to detect at least one of tones and emotions, such as anger, joy, sadness, and disgust, from natural language words parsed by parser 216. Cognitive engine 208 and generates an analysis, such as analysis 128 shown in block form in FIG. 1, based on linguistic analysis 218 of oral feedback 212.

As depicted, printer 202 includes agent 210. Agent 210 is a software agent that stores contextual meanings of natural language words, as determined by cognitive analysis system 256 of computer system 258. Cognitive analysis system 256 can periodically push updates 260 to update contextual meanings of natural language of agent based on learning derived by cognitive analysis system 256. In one illustrative example, cognitive analysis system 256 is a technology platform that uses natural language processing and machine learning to reveal insights from large amounts of unstructured data. Cognitive analysis system 256 generates updates 260 based on insights revealed from the data.

Profile manager 220 updates quality control profile 222 for printer 202 according the analysis of oral feedback 212 by cognitive engine 208. In one illustrative example, profile manager 220 can display status 224 of printer 202 according to quality control profile 222 on display 226.

Display 226 provides a mechanism to display information to a user. For example, display 226 may be a display associated with printer 202. For example, display 226 may be implemented as part of mobile device 228. In this manner, profile manager 220 can notify user 214 about other feedback received by other users of printer 202, as exemplified by quality control profile 222.

In this manner, profile manager 220 provides a mechanism to display status 224 of printer 202 based on oral feedback 212 provided by user 214. Profile manager 220 reduces the time and effort needed by user 102 to generate a print job of a particular quality when using plurality of service devices 200.

Vending machine 204 is an example of one type of service device that may be implemented within plurality of service devices 200, such as service device 108 of FIG. 1. Vending machine 204 includes a number of different components. As depicted, vending machine 204 includes recording device 230, cognitive engine 232, and agent 234.

Recording device 230 is an example of recording device 122 of FIG. 1. Recording device 230 is associated with vending machine 204. Recording device 230 stores oral feedback 212 provided by user 214 in response to vending a food item by vending machine 204. Oral feedback 212 stored on recording device 230 may include spontaneous statements by user 214 regarding the quality of the dispensed food item or operation of vending machine 204. For example, user 214 may orally state, "it's not working," "it's not good quality," "not working properly," "does not dispense anything," "this has expired," or "this tastes disgusting."

Cognitive engine 232 is an example of cognitive engine 124 of FIG. 1. In this illustrative example, cognitive engine 232 uses natural language processing to analyze oral feedback 212. As depicted, cognitive engine 232 includes parser 236 and linguistic analysis 238. Parser 236 parses natural language words from oral feedback 212 stored on recording device 230. Linguistic analysis 238 infers a contextual meaning of the natural language words regarding the vending of a food item by vending machine 204.

In one illustrative example, linguistic analysis 238 analyzes morphological, syntactical, and semantic structures of oral feedback 212 to detect at least one of tones and emotions, such as anger, joy, sadness, and disgust, from natural language words parsed by parser 236. Cognitive engine 232 generates an analysis, such as analysis 128 shown in block form in FIG. 1, based on linguistic analysis 238 of oral feedback 212.

As depicted, vending machine 204 includes agent 234. Agent 234 is a software agent that stores contextual meanings of natural language words, as determined by cognitive analysis system 256. Cognitive analysis system 256 can periodically push updates 260 to update contextual meanings of natural language of agent based on learning derived by cognitive analysis system 256.

Profile manager 220 updates quality control profile 240 for vending machine 204 according the analysis of oral feedback 212 by cognitive engine 232. In one illustrative example, profile manager 220 can display status 224 of vending machine 204 according to quality control profile 240 on display 226.

In this manner, profile manager 220 provides a mechanism to display status 224 of vending machine 204 based on oral feedback 212 provided by user 214. Profile manager 220 reduces the time and effort needed by user 102 to obtain a vended food item of a particular quality when using plurality of service devices 200.

In one illustrative example, display 226 is implemented on mobile device 228. Mobile device 228 can be a mobile telephone, a tablet computer, a laptop computer, capable of running application 242.

In this illustrative example, application 242 represents each of the plurality of service devices 200 as one or more icons 244 displayed on display 226. In this illustrative example, each one of icons 244 is displayed in a different one of colors 246 to indicate status 224 of the associated one of plurality of service devices 200.

For example, based on an associated one of quality control profiles 262 indicating more than 50% positive feedback for the associated one of plurality of service devices 200, application 242 may display icon 244 as having a first color, for example, green. For example, based on an associated one of quality control profiles 262 indicating mixed feedback, between 30 and 50% positive, for the associated one of plurality of service devices 200, application 242 may display icon 244 as having a second color, for example, yellow. For example, based on an associated one of quality control profiles 262 indicating less than 30% positive feedback for the associated one of plurality of service devices 200, application 242 may display icon 244 as having a third color, for example, red.

In one illustrative example, profile manager 220 can notify service technician 248 based on criteria for feedback of quality control profiles 262. For example, based on an associated one of quality control profiles 262 indicating less than 30% positive feedback for the associated one of plurality of service devices 200, profile manager 220 can notify service technician 248 regarding issue affecting the quality of the associated one of plurality of service devices 200. When service technician 248 has addressed the issue, profile manager 220 resets the quality control profile for the associated one of plurality of service devices 200.

In one illustrative example, the service environment is modified to include camera 250. In this illustrative example, camera 250 is a device that records images of physical gestures 252 made by user 214 as feedback 254. Images of physical gestures 252 may be recorded as at least one of a photograph, a video image, or some other type of image.

In this illustrative example, at least one of cognitive engine 208 and cognitive engine 232 monitors for images generated by camera 250 for physical gestures 252 that indicates feedback 254 with regard to one of plurality of service devices 200. For example, user 214 may gesture tweaking the nose, or hitting his head with hand to indicate he is not happy with the device.

In this illustrative example, at least one of cognitive engine 208 and cognitive engine 232 perform a gesture based analysis of images generated by camera 250 to infer feedback for an associated one of plurality of service devices 200. Quality control profiles 262 can then be updated based on the gesture analysis of images generated by camera 250.

Service environment 100 in FIG. 1 and plurality of service devices 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, types of devices other than mobile device 228 may be used to view status 224 of quality control profiles 262 of plurality of service devices 200. For example, a tablet computer, a digital camera, or another suitable type of device also may be used to view status 224 of quality control profiles 262.

Figure 3:
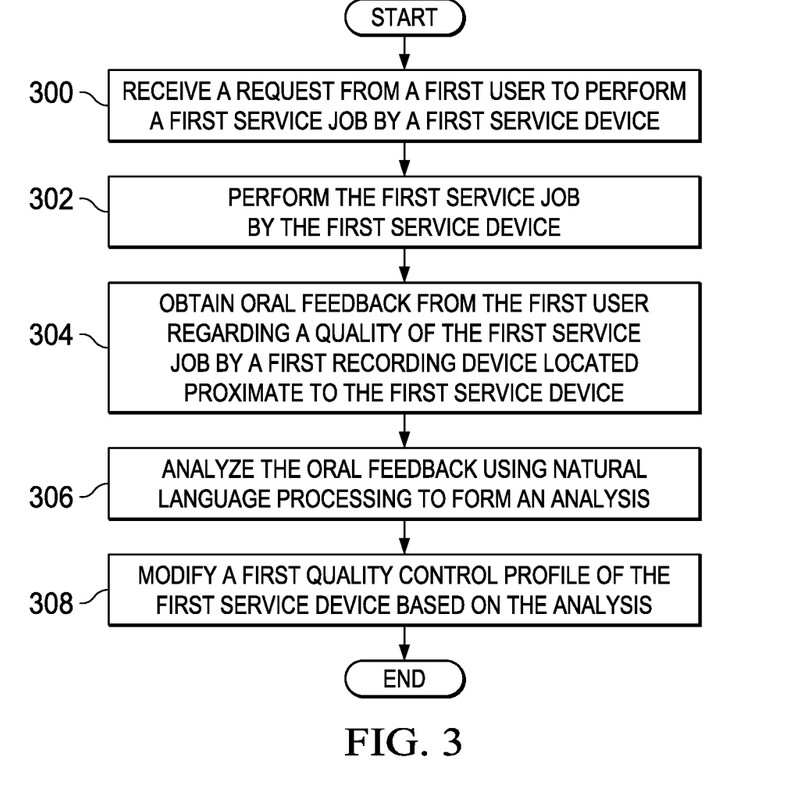
FIG. 3 is a flowchart of a process for using oral feedback to facilitate user selection among a plurality of service devices, each service device having a dynamically-updatable quality control profile in accordance with an illustrative embodiment.

Turning next to FIG. 3, a flowchart of a process for using oral feedback to facilitate user selection among a plurality of service devices, each service device having a dynamically-updatable quality control profile is depicted in accordance with an illustrative embodiment. The process illustrated in FIG. 3 may be implemented in service device 108 and profile manager 110 in FIG. 1, or plurality of service devices 200 and profile manager 220 in FIG. 2. The process in this flowchart may take the form of a program code that runs on plurality of service devices 104 in FIG. 1, computer system 112 in FIG. 1, plurality of service devices 200 in FIG. 2, computer system 258 in FIG. 2, or in some other device.

The process begins by receiving a request from a first user to perform a first service job by a first service device (step 300). The process then performs the first service job by the first service device (step 302). Then the process obtains oral feedback from the first user regarding a quality of the first service job by a first recording device located proximate to the first service device (step 304).

The process analyzes the oral feedback using natural language processing, to form an analysis (step 306). In one illustrative example, the process analyzes the oral feedback by parsing natural language words from the oral feedback. The process then infers a contextual meaning of the natural language words regarding the quality of the first service job.

The process modifies the first quality control profile of the first service device based on the analysis (step 308). The process terminates thereafter.

Figure 4:
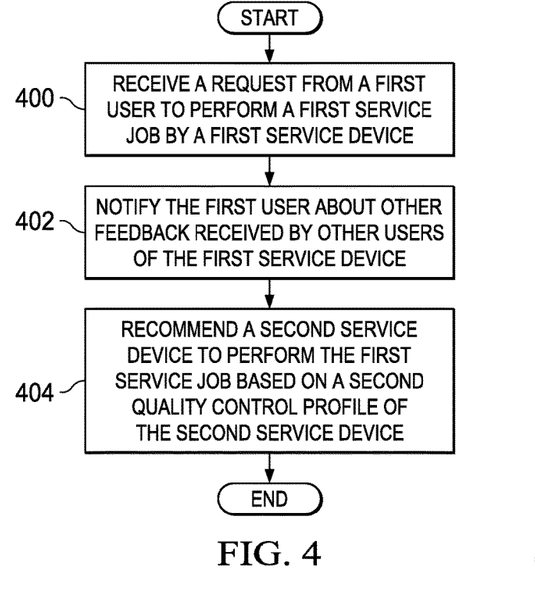
FIG. 4 is a flowchart of a process for recommending an alternative service device based on oral feedback to facilitate user selection among a plurality of service in accordance with illustrative embodiment.

With reference now to FIG. 4, a flowchart of a process for recommending an alternative service device based on oral feedback to facilitate user selection among a plurality of service is depicted in accordance with an illustrative embodiment. The process illustrated in FIG. 3 may be implemented in service device 108 and profile manager 110 in FIG. 1, or plurality of service devices 200 and profile manager 220 in FIG. 2. The process in this flowchart may take the form of a program code that runs on plurality of service devices 104 in FIG. 1, computer system 112 in FIG. 1, plurality of service devices 200 in FIG. 2, computer system 258 in FIG. 2, or in some other device.

The process begins by receiving a request from a first user to perform a first service job by a first service device (step 400). In response to receiving the request to perform the first service job, the process notifies the first user about other feedback received by other users of the first service device (step 402). In one illustrative example, the process can notify user by displaying an icon for the service device in a particular color indicative of a status of the device based on the quality control profile.

The process then recommends a second service device to perform the first service job based on a second quality control profile of the second service device (step 404). In one illustrative example, the process can recommend the second service device by highlighting or otherwise indicating an icon for the second service device on a display, such as display 226 of FIG. 2. The process terminates thereafter.

Figure 5:
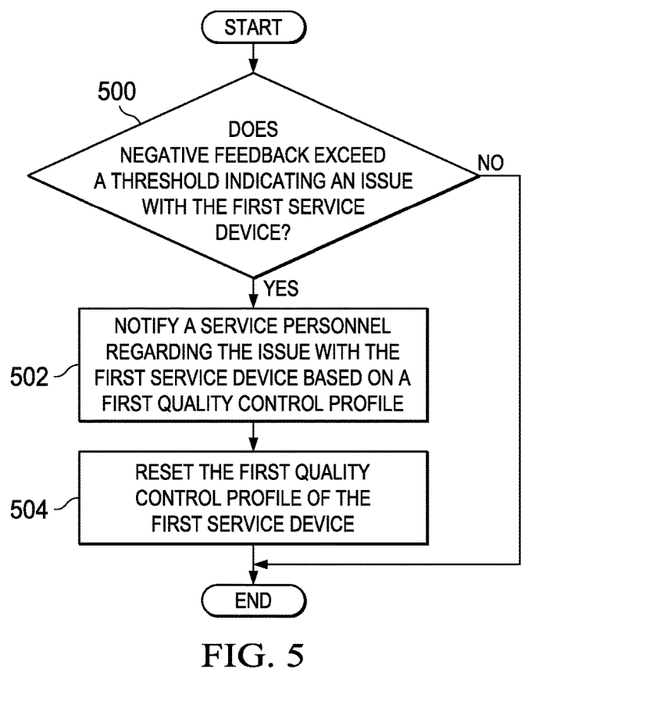
FIG. 5 is a flowchart of a process for resetting user feedback for a service device in accordance with illustrative embodiment.

Turning now to FIG. 5, a flowchart of a process for resetting user feedback for a service device is depicted in accordance with illustrative embodiment. The process illustrated in FIG. 5 may be implemented in profile manager 110 in FIG. 1 or profile manager 220 in FIG. 2. The process in this flowchart may be performed in response to modifying a quality control profile, as illustrated in step 308 of FIG. 3.

The process begins by determining whether negative feedback has exceeded a threshold indicating an issue with the first service device (step 500). For example, the determination can be based on an associated quality control profile of the service device indicating less than 30% positive feedback for the service device.

In response to determining that negative feedback has exceeded the threshold ("yes" at step 500), the process notifies a service personnel regarding an issue of the first service device based on the first quality control profile (step 502). In response to the service personnel addressing the issue, the process resets the first quality control profile of the first service device (step 504). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In one example, a user gives a print job to be printed at a first printer, such as printer 202 of FIG. 2. The printer has a recording device to capture the words spoken by user, and a cognitive engine to infer the meaning of the words uttered.

For example, when the user goes to pick up the printed job to printer room, the user may remark on the quality of the print job, saying, for example, "it's dark," "it's not good quality," "the paper is blank," "it's low on toner," "the printer has malfunctioned," "the paper is jammed," or "it doesn't print anything, just blank papers or blank lines." A recording device, such as recording device 206 of FIG. 2, capture the words spoken by user, and a cognitive engine, such as cognitive engine 208 of FIG. 2, parses the natural language and derive meanings of the words spoken.

A software agent based on a Cognitive analysis system, such as cognitive analysis system 256 of FIG. 2, can be installed on the printer. The agent stores contextual meanings of natural language words, as determined by the cognitive analysis system. The cognitive analysis system can periodically push updates to the printer to update contextual meanings of natural language of agent based on learning derived by cognitive analysis system. The cognitive analysis system can be, for example Watson's Tone Analyzer, available as a service from International Business Machines. The text/document file is analyzed using traditional pattern matching rules that are used to perform text mining, as exemplified by IBM InfoSphere and other known natural language processing techniques including both manual coding of language rules and machine learning of statistical patterns such as is provided by IBM Watson and/or relationship extraction/sentiment analysis techniques.

Continuing with the current example, oral feedback regarding the print job is analyzed by the print software or agent located on printer. Based on the analysis, a profile manager updates a quality control profile of the first printer. The profile manager can then determine a status of the printer based on the cumulative feedback.

Whenever a new job is requested, the profile manager can instruct the submitter about the feedback received by other users. Printers can be connected and feedback can be shared across printer software and printer software can recommend the printer to be selected for desired quality. Based on the quality control profile, the requested printer can perform the print job or the profile manager can advise the user to print at another location.

In another illustrative example, a user wants to use a particular vending machine, such as vending machine 204 of FIG. 2. The uses a mobile application to review the status of the vending machine. The mobile application can be, for example, application 242 of FIG. 2. The mobile application allows the user to review the feedback provided by other users by highlighting an icon of the vending machine in different colors.

For example, based on criteria such as more than 50% positive feedback about the vending machine, the icon is green. If feedback is are mixed, for example between 30 and 50% positive feedback, the icon is yellow. If feedback is negative (less than 30%), then the icon is red. Feedback can be reset once service personnel fixes the issues that resulted in negative feedback.

Based on the status displayed in the mobile application, a user goes to a particular vending machine. The vending machine has a recording device to capture the words spoken by user, and a cognitive engine to infer the meaning of the words uttered.

For example, when the user goes to pick up the vended item from the vending machine, the user may remark on the quality of the vended item or vending machine, saying, for example, "it's not working," "it's not good quality," "not working properly," "does not dispense anything," "this has expired," or "this tastes disgusting." A recording device, such as recording device 230 of FIG. 2, capture the words spoken by user, and a cognitive engine, such as cognitive engine 232 of FIG. 2, parses the natural language and derive meanings of the words spoken.

A software agent based on a cognitive analysis system, such as cognitive analysis system 256 of FIG. 2, can be installed on the vending machine. The agent stores contextual meanings of natural language words, as determined by the cognitive analysis system. The cognitive analysis system can periodically push updates to the vending machine to update contextual meanings of natural language of agent based on learning derived by cognitive analysis system. The cognitive analysis system can be, for example Watson's Tone Analyzer, available as a service from International Business Machines.

Continuing with the current example, oral feedback regarding the vended item or vending machine is analyzed by the software or agent located on the vending machine. Based on the analysis, a profile manager updates a quality control profile of the vending machine. The profile manager can then determine a status of the vending machine based on the cumulative feedback.

Whenever user views the status of vending machine on the mobile application, the status is updated to reflect the cumulative feedback received by other users. Through the mobile application, the profile manager, such as profile manager 220 of FIG. 2 can inform user about either selecting a different vending machine or going to a different vending machine located at a different location. In this manner, profile manager 220 ensures a better customer experience by facilitating selection of a vending machine based on positive feedback from previous users.

Figure 6:
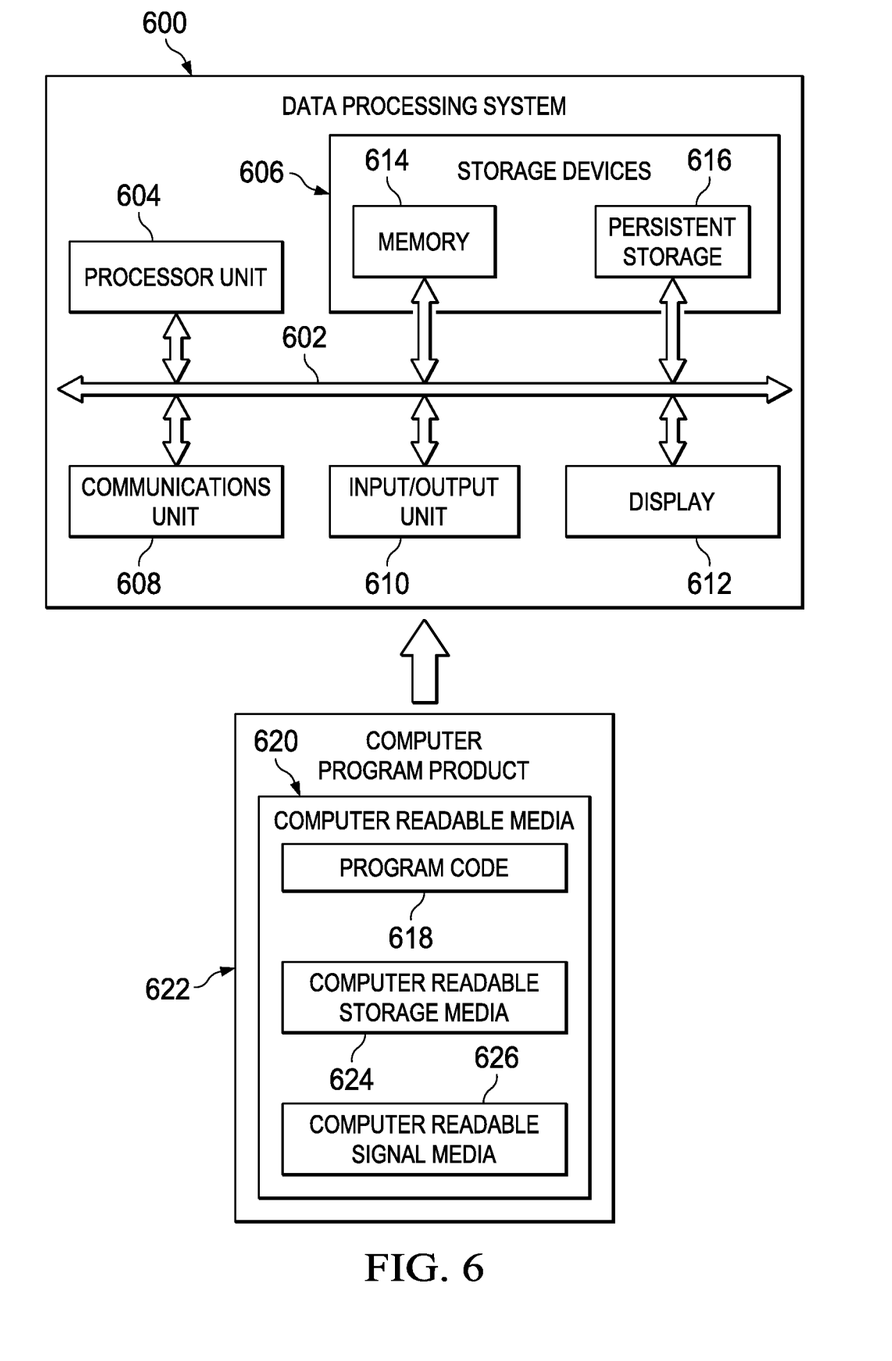
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement computer system 112 and cognitive engine cognitive engine 124 in FIG. 1. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to process instructions for software that may be loaded into memory 606. Processor unit 604 may be a number of processors, a multi-processor core, or some other suitable type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable types of information either on a temporary basis, a permanent basis, or both on a temporary basis and a permanent basis. Storage devices 616 may also be referred to as computer-readable storage devices in these illustrative examples. In these examples, memory 606 may be, for example, a random access memory or any other suitable type of volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory drive, a rewritable optical disk, a rewritable magnetic tape, or some combination of the foregoing. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable type of input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and run by a processor in processor unit 604. The program code in the different examples may be embodied on different physical or computer-readable storage media, such as memory 606 or persistent storage 608.

Program code 618 is located in a functional form on computer-readable media 620 that is selectively removable and may be loaded onto or transferred to data processing system 600 for processing by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618, rather than a medium that propagates or transmits program code 618.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cables, coaxial cables, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, the illustrative embodiments of the present invention provide a computer implemented method, a computer system, and a computer program product for provides a method for using oral feedback to facilitate user selection among a plurality of service devices. Each service device has a dynamically-updatable quality control profile. In one illustrative example, a first service device receives a request from the first user to perform a first service job. The first service device performs the first service job. A first recording device located proximate to the first service device obtains oral feedback from the first user regarding the quality of the first service chop. The first service device analyzes the oral feedback using natural language processing to form an analysis. The first service device modifies the first quality control profile of the first service device based on the analysis.

The descriptions of the various embodiments of the present invention have been presented for purpose of illustration, but are not intended to be exhaustive or limited to the embodiments disclosed. Many modifications and variations will be apparent to those of ordinary skill in the art without departing from the scope and spirit of the described embodiment. For example, cognitive engine 124 of FIG. 1 (or cognitive engine 208 and cognitive engine 232 of FIG. 2) may be extended to recognize physical gestures in addition to or in place of oral feedback. The terminology used herein was chosen to best explain the principles of the embodiments, the practical application or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods and computer program products according to the various embodiments of the present invention. In this regard, each block in the flowcharts or block diagrams may represent a module, a segment, or a portion of code, which comprises one or more instructions for implementing the specified logical function or functions. It should also be noted that, in some alternative implementations, the functions noted in the blocks may occur out of the order noted in the figures. For example, two blocks shown in succession may, in fact, be performed substantially concurrently, or the blocks may sometimes be performed in the reverse order, depending upon the functionality involved. It should also be noted that each block of the block diagrams and/or flowchart illustrations, or combinations of blocks in the block diagrams and/or flowchart illustrations, can be implemented by special purpose hardware-based systems that perform the specified functions or acts, or combinations of special purpose hardware and computer instructions.

What is claimed is:

1. A method for using oral feedback to facilitate user selection among a plurality of service devices, each service device having a dynamically-updatable quality control profile, the method comprising:
   receiving, by a first service device, a request from a first user to perform a first service job;
   performing, by the first service device, the first service job;
   obtaining, by a first recording device located proximate to the first service device, oral feedback from the first user regarding a quality of the first service job;
   analyzing, using natural language processing, the oral feedback to form an analysis; and
   modifying, based on the analysis, a first quality control profile of the first service device.

2. The method of claim 1, wherein analyzing the oral feedback further comprises:
   parsing natural language words from the oral feedback; and
   inferring a contextual meaning of the natural language words regarding the quality of the first service job.

3. The method of claim 1, further comprising:
   responsive to receiving the request to perform the first service job, notifying the first user about other feedback received from other users of the first service device; and
   recommending a second service device to perform the first service job based on a second quality control profile of the second service device.

4. The method of claim 1, further comprising:
   pushing the modification to the first quality control profile to a mobile device application, wherein the mobile device application displays separate quality control profiles for all of the plurality of service devices such that users are able to use the separate quality control profiles to determine which of the plurality of service devices are appropriate for particular service jobs.

5. The method of claim 1, further comprising:
   notifying a service personnel regarding an issue of the first service device based on the first quality control profile; and
   responsive to the service personnel addressing the issue of the first service device, resetting the first quality control profile.

6. The method of claim 1, wherein the service devices are printers and wherein the first service job is printing a document.

7. The method of claim 1, wherein the service devices are vending machines and wherein the first service job is vending a food item.

8. The method of claim 1, further comprising:
   obtaining, by a second recording device located proximate to the first service device, video feedback from the first user regarding the quality of the first service job;
   analyzing, using gesture analysis, the video feedback to form the analysis; and modifying, based on the analysis, the first quality control profile of the first service device.

9. A service device comprising:
   a recording device configured to receive oral feedback from a first user regarding a quality of a first service job performed by a first service device;
   a natural language processing agent configured to analyze the oral feedback to form an analysis; and
   a first quality control profile that is dynamically updated based on the analysis of the oral feedback.

10. The service device of claim 9, wherein the natural language processing agent is further configured:
    to parse natural language words from the oral feedback; and
    to infer a contextual meaning of the natural language words regarding the quality of the first service job.

11. The service device of claim 9, wherein the service device is further configured:
    to notify the first user about other feedback received from other users of the first service device in response to receiving a request to perform the first service job; and
    to recommend a second service device to perform the first service job based on a second quality control profile of the second service device.

12. The service device of claim 9, wherein the service device is further configured:
    to push a modification of the first quality control profile to a mobile device application, wherein the mobile device application displays separate quality control profiles for all of a plurality of service devices such that users are able to use the separate quality control profiles to determine which of the plurality of service devices are appropriate for particular service jobs.

13. The service device of claim 9, wherein the service device is further configured:
    to notify a service personnel regarding an issue of the first service device based on the first quality control profile; and
    to reset the first quality control profile in response to the service personnel addressing the issue of the first service device.

14. The service device of claim 9, wherein the service devices are printers and wherein the first service job is printing a document.

15. The service device of claim 9, wherein the service devices are vending machines and wherein the first service job is vending a food item.

16. A computer program product for using oral feedback to facilitate user selection among a plurality of service devices, each service device having a dynamically-updatable quality control profile, the computer program product comprising:
    a computer-readable storage medium;
    a first program code, stored on the computer-readable storage medium, for receiving a request from a first user to perform a first service job by a first service device;
    a second program code, stored on the computer-readable storage medium, for performing the first service job;
    a third program code, stored on the computer-readable storage medium, for obtaining the oral feedback from the first user regarding a quality of the first service job using a first recording device located proximate to the first service device;
    a fourth program code, stored on the computer-readable storage medium, for analyzing the oral feedback using natural language processing to form an analysis; and
    a fifth program code, stored on the computer-readable storage medium, for modifying a first quality control profile of the first service device based on the analysis.

17. The computer program product of claim 16, wherein the fourth program code further comprises:
    program code, stored on the computer-readable storage medium, for parsing natural language words from the oral feedback; and
    program code, stored on the computer-readable storage medium, for inferring a contextual meaning of the natural language words regarding the quality of the first service job.

18. The computer program product of claim 16, further comprising:
    program code, stored on the computer-readable storage medium, for notifying the first user about other feedback received by other users of the first service device in response to receiving the request to perform the first service job; and
    program code, stored on the computer-readable storage medium, for recommending a second service device to perform the first service job based on a second quality control profile of the second service device.

19. The computer program product of claim 16, further comprising:
    program code, stored on the computer-readable storage medium, for pushing the modification to the first quality control profile to a mobile device application, wherein the mobile device application displays separate quality control profiles for all of the plurality of service devices such that users are able to use the separate quality control profiles to determine which of the plurality of service devices are appropriate for particular service jobs.

20. The computer program product of claim 16, further comprising:
    program code, stored on the computer-readable storage medium, for notifying a service personnel regarding an issue of the first service device based on the first quality control profile; and
    program code, stored on the computer-readable storage medium, for resetting the first quality control profile in response to the service personnel addressing the issue of the first service device.

* * * * *